July 21, 1942.    J. LORIMOR    2,290,835
TRACTOR POWER TAKE-OFF
Filed June 22, 1939    3 Sheets-Sheet 1

John Lorimor
INVENTOR

BY Victor J. Evans & Co.
ATTORNEYS

July 21, 1942.   J. LORIMOR   2,290,835
TRACTOR POWER TAKE-OFF
Filed June 22, 1939   3 Sheets-Sheet 2

John Lorimor
INVENTOR
BY Victor J. Evans & Co.
ATTORNEYS

July 21, 1942.  J. LORIMOR  2,290,835
TRACTOR POWER TAKE-OFF
Filed June 22, 1939   3 Sheets-Sheet 3

John Lorimor
INVENTOR
By Victor J. Evans & Co.
ATTORNEYS

Patented July 21, 1942

2,290,835

UNITED STATES PATENT OFFICE 2,290,835

TRACTOR POWER TAKE-OFF

John Lorimor, Imogene, Iowa, assignor to J. I. Case Company, Racine, Wis., a corporation Application June 22, 1939, Serial No. 280,607

9 Claims. (Cl. 74—11)

This invention relates to a tractor power take-off and has for an object to provide a power take-off for tractors which will be actuated by the fly-wheel of the motor, which will operate independently of the conventional tractor clutch, and which will be controlled by a clutch so that power may be transmitted from the tractor to a harvesting machine of any type regardless of whether the tractor is traveling or stationary and whereby the motion of the tractor may be controlled without affecting the operation of the driven machine.

A further object is to provide a device of this character which may be constructed to be applied to various types of tractors, regardless of whether the fly-wheel shaft is parallel to the take-off shaft or is perpendicular thereto.

A further object is to provide a device of this character which will be formed of a few strong simple and durable parts which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1:
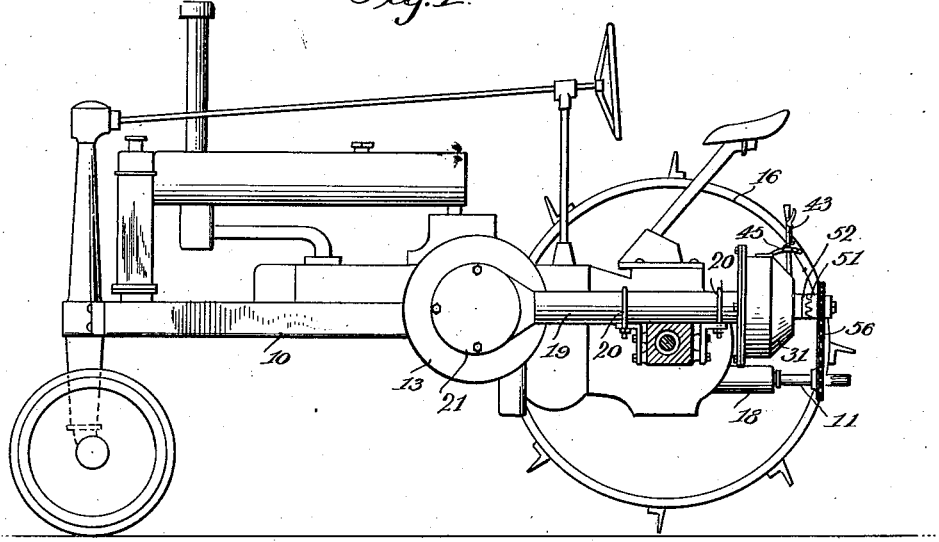
Figure 1 is a longitudinal sectional view taken on the line 1—1 of Figure 2 showing a "John Deere" tractor equipped with a power take-off constructed in accordance with the invention.
Figure 2:
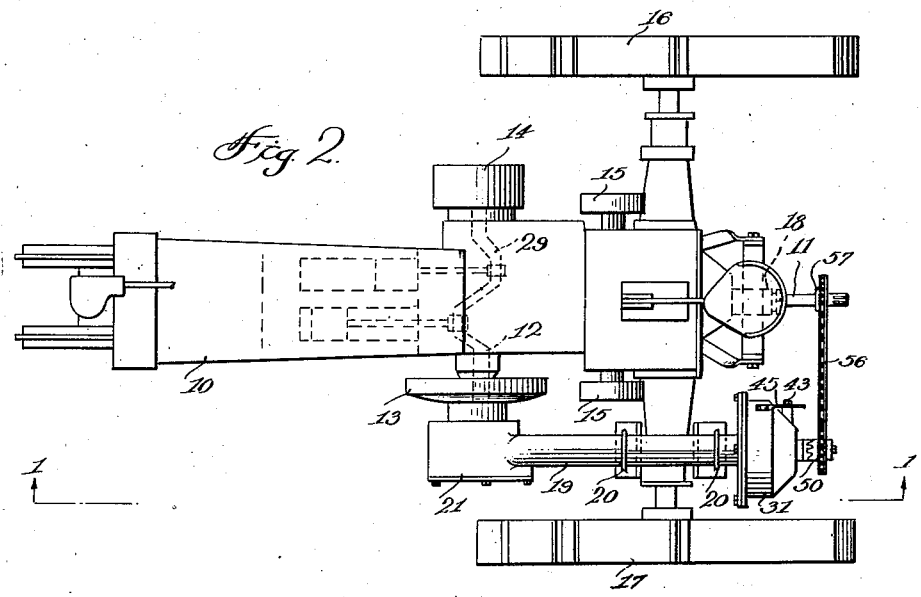
Figure 2 is a plan view of the tractor shown in Figure 1 showing the power take-off shaft perpendicular to the fly-wheel shaft.

Referring now to the drawings in which like characters of reference designate similar parts in the various views, 10 designates a tractor of the John Deere type, in which the take-off shaft 11 extends longitudinally of the tractor and projects from the rear end thereof, perpendicular to the drive shaft 12 of the fly-wheel 13 which latter is disposed exteriorly of the left side of the tractor frame as shown in Figures 1 and 2. Ordinarily, the power take-off shaft is declutched from the power when the clutch 14 of the ground wheels 16 and 17 is declutched. 15 and 15 are steering brakes.

Figure 3:
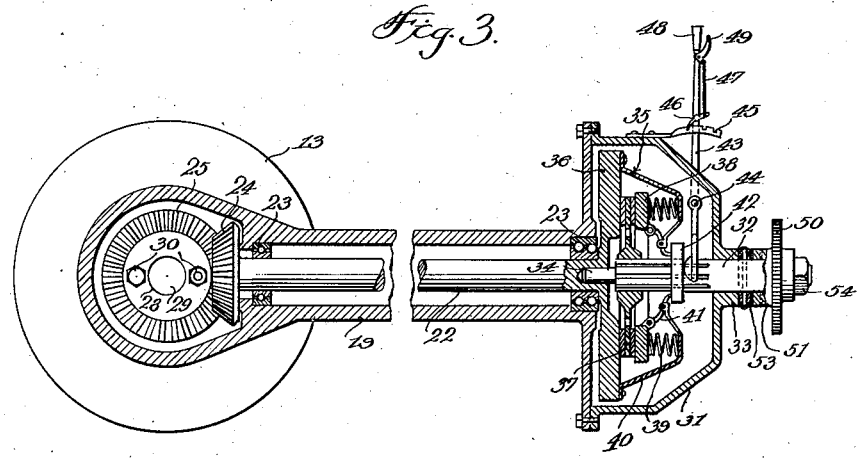
Figure 3 is an enlarged longitudinal sectional view of the power take-off mechanism and clutch constructed in accordance with the invention, taken on the line 3—3 of Figure 4.
Figure 4:
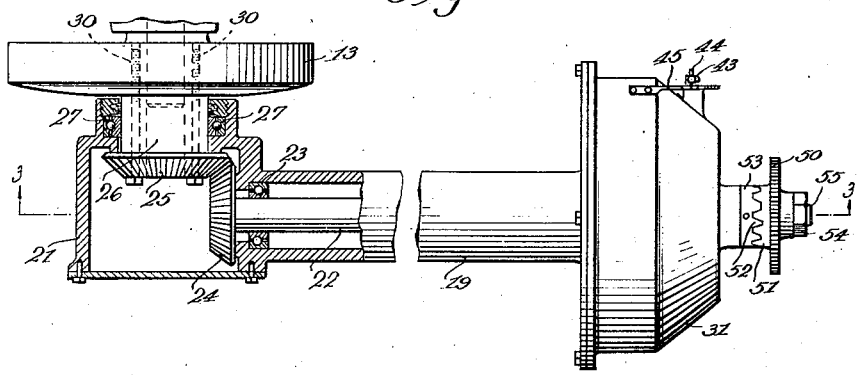
Figure 4 is a plan view of the parts shown in Figure 3 with portions removed.

In carrying out the invention, the power take-off shaft 11 is disconnected from the power of the tractor and simply idles in its bearing 18. For connecting this take-off shaft to the power at all times, in accordance with the invention, as best shown in Figures 2 and 3, a tubular housing 19 is secured to the frame of the tractor through the medium of U-bolts 20, best shown in Figures 1 and 2, and is equipped at the front end with a gear case 21. A shaft 22 is journaled in ball bearings 23 in the ends of the tubular housing 19 and is equipped at the front end with a bevel gear 24.

A second bevel gear 25 is provided with a hub 26 which is rotatably mounted in ball bearings 27 carried by the gear case 21 and is provided with an opening 28, best shown in Figure 3, which receives the fly-wheel end of the motor crank shaft 29. Both the hub 26 and the fly-wheel 13 are provided with openings to permit the gear 25 to be rigidly secured to the fly-wheel through the medium of screw bolts 30 passed through the gear hub and into the fly-wheel. The gear 25 meshes with the gear 24 so that whenever the motor is running the shaft 22 will be rotated.

A clutch housing 31 is secured to the rear end of the tubular housing 19. A stub shaft 32 is journaled at the outer end in a bearing 33 on the clutch housing and at the inner end is provided with a cylindrical guide finger 34 which enters an axial opening in the shaft 22.

A conventional disc clutch 35 is disposed on the stub shaft 32 and comprises preferably a fly-wheel 36 formed integral with the end of the shaft 22, a friction disc 37 splined on the stub shaft 32, a pressure plate 38 normally held by springs 39 against the friction disc to hold the clutch in clutched position. A casing 40 is secured to the fly-wheel 36 and the springs 38 are tensioned by the casing. Pivoted fingers 41 are carried by the casing and bear against the collar 42 on the stub shaft 32. A lever 43 is pivotally mounted, as shown at 44, on the clutch housing and bears with its inner end against the collar 42. A rack 45 is fixed to the clutch housing and receives the dog 46 of a link 47 which is pivoted on the lever near the grip 48 and is provided with a handle 49.

It will be seen that, just as in an automobile, the clutch is normally in clutched position so that the stub shaft 32 will be driven continuously when the fly-wheel 13 of the motor is rotating. To declutch the stub shaft 32 the dog 46 is released and the lever 43 is moved to shift the collar 42 and rock the fingers 41 to withdraw the pressure plate 38 from the friction disc 37 with resultant compressing of the springs 39 to throw in the clutch when the lever is again released.

A gear 50 is secured to the shaft, preferably through the medium of clutch teeth 51 engaging similar clutch teeth 52 on a collar 53 which is keyed to the stub shaft 32. A nut 54 on a reduced end 55 of the stub shaft bears against the gear and holds the clutch teeth clutched.

Figure 5:
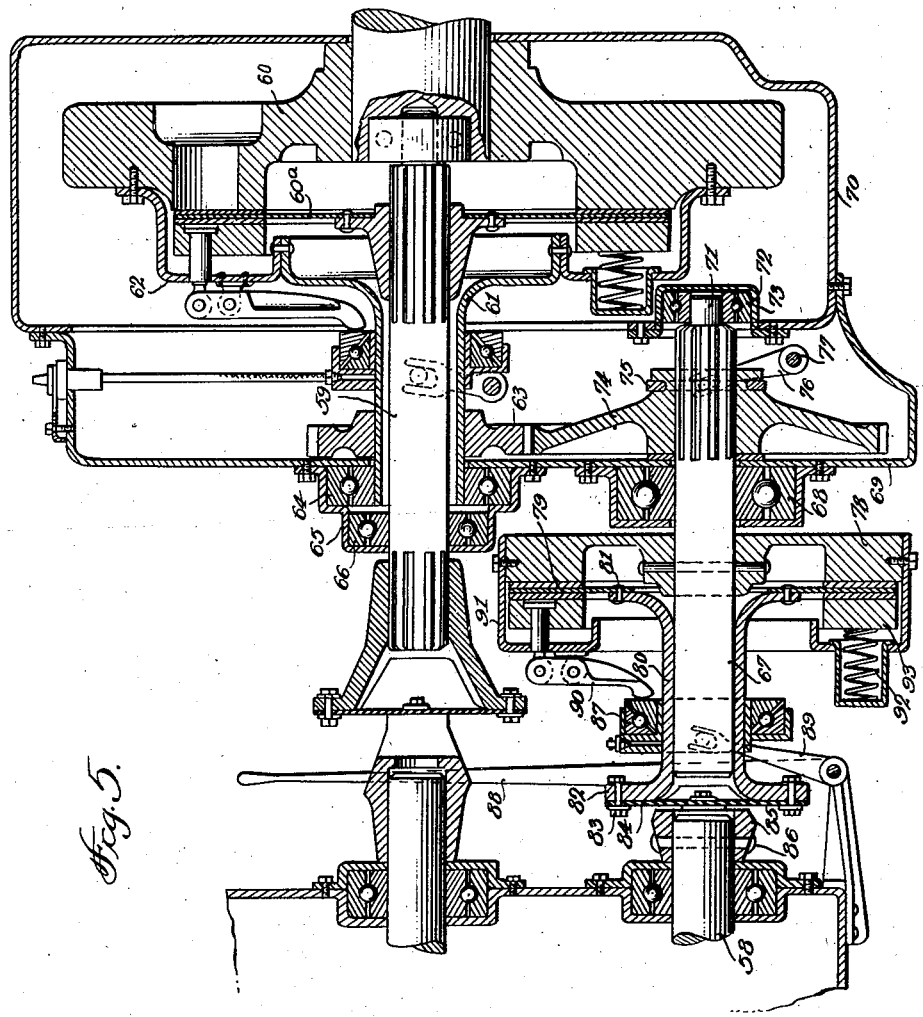
Figure 5 is an enlarged longitudinal sectional view of a power take-off, constructed in accordance with the invention, and applied to a "Farmall" tractor in which the power take-off shaft is parallel to the fly-wheel drive shaft.

A drive chain 56, best shown in Figures 1 and 2, is trained at one end over the gear 50 and at the other end is trained over a gear 57 which is fixed to the power take-off shaft 11. Thus it will be seen that power from the fly-wheel 13 is transmitted to the bevel gears 25 and 24, shaft 22, clutch 35, stub shaft 32, gear 50, chain drive 56, and gear 57 to the take-off shaft 11 so that power is imparted to the take-off shaft whenever the motor is running. In Figure 5 there is shown a modified form of the invention, adaptable to tractors of the Farmall or similar type in which the power take-off shaft 58 is substantially parallel to the conventional clutch shaft 59 which drives the tractor wheels through well-known expedients not necessary to illustrate. Shaft 59 is driven by the conventional fly-wheel 60, through clutch means of well-known or suitable type including a driven member 60ª engaged with the fly-wheel by suitable or well-known mechanism.

In applying the invention to a tractor of the above type, an extension sleeve 61 is secured to and is carried on the conventional clutch casing 62, so that the sleeve rotates when the fly-wheel is turning. A driving pinion 63 is fixed to the sleeve. The sleeve is journaled at the outer end in a bearing 64 which is confined in a bearing case 65 which also houses a bearing 66 for the clutch shaft 59.

In further carrying out the invention, I provide a shaft 67 which is disposed in a bearing 68 carried by a bearing case 69 which is secured to the conventional clutch housing 70. This shaft is also provided with a reduced end 71 which is journaled in a bearing 72 carried by a bearing case 73 which is secured to the clutch housing 70. Between both bearings a large gear 74 may be splined on the shaft 67 and may be meshed or demeshed from the gear 63 through the medium of a collar 75 and yoke 76 which is carried by a snaft 77 which may be manually operated to shift the gear 74 longitudinally of the shaft 67. The purpose of disconnecting this gear is to prevent the power take-off shaft 58 from being connected to the power.

A clutch member 78 is fixed to the shaft 67 and to the friction disc 79 of this clutch, an extension sleeve 80 is fixed as shown at 81. The sleeve surrounds the shaft 67 and is equipped with universal joint fingers 82 which are secured, as shown at 83, to a flexible plate 84 which carries a hub 85 which is secured by a pin 86 to the conventional power take-off shaft 58.

A throw-off bearing 87 is slidably mounted on the sleeve and is controlled by a lever 88 and a yoke 89 to move in and out of engagement with clutch fingers 90 pivoted to the casing 91 which is carried by the fly-wheel 78, these fingers coacting with springs 92 in controlling the clutch pressure plate 93 in the usual manner.

By operating the lever 88, the extension sleeve 80 may be clutched or declutched to the member 78 and when clutched thereto, the power take-off shaft 58 will be driven as a unit with the shaft 67, gear 64, gear 63, extension sleeve 61, and motor fly-wheel 60. When the extension sleeve 80 is declutched from the member 78, it will remain stationary while the shaft 67 idles therein and consequently the power take-off shaft 58 will remain stationary.

From the above description it is thought that the construction and operation of the invention will be fully understood without further explanation.

It is to be understood that other details of construction within the scope of the appended claims are contemplated, and that the invention is not to be taken as limited to the specific construction disclosed or in any manner except as defined by said claims.

What is claimed is:

1. The combination with a tractor having a motor crank shaft, a fly-wheel on the shaft, and a power take-off shaft extending in a plane parallel to the plane of the crank shaft, of a driven shaft extending in alignment with the power take-off shaft, a clutch including a casing supported from the fly-wheel for rotation therewith, a clutch shaft disposed in alignment with the crank shaft, an extension sleeve surrounding the clutch shaft and in driven relation with said casing, a gear connection between the driven shaft and the extension sleeve, said extension sleeve being adapted to continuously drive the driven shaft through said gear connection when the fly-wheel is rotating, and a clutch connecting the driven shaft with the power take-off shaft.

2. The combination with a tractor having a motor crank shaft, a fly wheel on the shaft and a power take-off shaft extending in the general direction of the crank shaft, of a driven shaft extending in the general direction of the power take-off shaft, a clutch shaft disposed substantially in alignment with the crank shaft, a clutch adapted for connecting said clutch shaft to be driven from said fly-wheel, extension means surrounding the clutch shaft, means connected for dependent and positive rotation with the fly-wheel outwardly of said clutch and connected in driving relation with said extension means, a motion transmitting connection between the driven shaft and the extension means, said extension means being adapted to continuously drive the driven shaft through said motion transmitting connection when the fly-wheel is rotating, and clutch means connecting the driven shaft with the power take-off shaft.

3. In a tractor having an engine crank shaft, a fly-wheel on the shaft and a power take-off shaft extending in the general direction of the crank shaft, the combination of a driven shaft extending in the direction of the power take-off shaft, a clutch shaft disposed substantially in alignment with the crank shaft, a clutch adapted for connecting said clutch shaft to be driven from said fly-wheel, an extension sleeve surrounding the clutch shaft, means connected for dependent and positive rotation with the fly-wheel outwardly of said clutch and connected in driving relation with said extension sleeve, a gear on the extension sleeve and connected to be driven thereby, a gear slidably keyed to said driven shaft and disposed to be shifted into and out of mesh with the first mentioned gear, and means for so shifting said gear.

4. In a tractor having an engine crank shaft, a fly-wheel on the shaft and a power take-off shaft extending in the general direction of the crank shaft, the combination of a driven shaft extending in the direction of the power take-off shaft, a clutch shaft disposed substantially in alignment with the crank shaft, a clutch adapted for connecting said clutch shaft to be driven from said fly-wheel, an extension sleeve surrounding the clutch shaft, means connected for dependent and positive rotation with the fly-wheel outwardly of said clutch and connected in driving relation with said extension sleeve, a gear on the extension sleeve and connected to be driven thereby, a gear slidably keyed to said driven shaft and disposed to be shifted into and out of mesh with the first mentioned gear, and clutch means connecting the driven shaft with the power take-off shaft.

5. In a tractor having an engine crank shaft, a fly-wheel on the shaft and a power take-off shaft extending in the general direction of the crank shaft, the combination of a driven shaft extending in the direction of the power take-off shaft, a clutch shaft disposed substantially in alignment with the crank shaft, a clutch adapted for connecting said clutch shaft to be driven from said fly-wheel, an extension sleeve surrounding the clutch shaft, means connected for dependent and positive rotation with the fly-wheel outwardly of said clutch and connected in driving relation with said extension sleeve, a gear on the extension sleeve and connected to be driven thereby, a gear on the driven shaft and connected to be driven thereby, and one of said gears being movable into and out of mesh with the other gear.

6. In a tractor having an engine crank shaft, a fly-wheel on the shaft and a power take-off shaft extending in the general direction of the crank shaft, the combination of a driven shaft extending in the direction of the power take-off shaft, a clutch shaft disposed substantially in alignment with the crank shaft, a clutch adapted for connecting said clutch shaft to be driven from said fly-wheel, an extension sleeve surrounding the clutch shaft, means connected for dependent and positive rotation with the fly-wheel outwardly of said clutch and connected in driving relation with said extension sleeve, a gear on the extension sleeve and connected to be driven thereby, a gear on the driven shaft and connected to be driven thereby, one of said gears being movable into and out of mesh with the other gear, and clutch means connecting the driven shaft with the power take-off shaft.

7. The combination with a tractor having an engine crank shaft, a fly-wheel on the shaft and a power take-off shaft extending in the general direction of the crank shaft, of a clutch shaft disposed substantially in alignment with the crank shaft, a clutch adapted for connecting said clutch shaft to be driven from said fly-wheel, extension means surrounding the clutch shaft and connected outwardly of said clutch for dependent and positive rotation with the fly-wheel, and a disengageable motion transmitting connection between said extension means and said power take-off shaft, said extension means being adapted to continuously drive the power take-off shaft through said connection when the fly-wheel is rotating and said connection is engaged.

8. The combination with a tractor having an engine crank shaft, a fly-wheel on the shaft and a power take-off shaft, of a clutch shaft disposed substantially in alignment with the crank shaft, a clutch adapted for connecting said clutch shaft to be driven from said fly-wheel, extension means surrounding the clutch shaft and connected outwardly of said clutch for dependent and positive rotation with the fly-wheel, and a disengageable motion transmitting connection between said extension means and said power take-off shaft, said extension means being adapted to continuously drive the power take-off shaft through said connection when the fly-wheel is rotating and said connection is engaged.

9. In a tractor having an engine, including a fly-wheel, clutch means associated with the fly-wheel and including a driven element, a shaft connected for actuation by the driven element and connected for driving the tractor; said clutch also including a casing connected to be positively rotated by the fly-wheel, a sleeve inclosing the shaft and connected to be positively rotated by the casing, a power take-off shaft on the tractor and motion transmitting connections from the sleeve to the power take-off shaft for rotating said power take-off shaft from the fly-wheel independently of the driven element.

JOHN LORIMOR.